United States Patent [19]

Ito

[11] Patent Number: 4,565,110

[45] Date of Patent: Jan. 21, 1986

[54] HYDRAULIC APPARATUS FOR A CONTINUOUSLY VARIABLE TRANSMISSION

[75] Inventor: Hiroshi Ito, Toyota, Japan

[73] Assignee: Toyota Jidosha Kabushiki Kaisha, Japan

[21] Appl. No.: 581,051

[22] Filed: Feb. 17, 1984

[30] Foreign Application Priority Data

Feb. 26, 1983 [JP] Japan ............................ 58-031298

[51] Int. Cl.⁴ ............................................ B60K 41/16
[52] U.S. Cl. ........................................ 74/868; 74/865; 74/867
[58] Field of Search ............... 74/856, 861, 865, 867, 74/868; 474/18, 28

[56] References Cited

U.S. PATENT DOCUMENTS

| | | | |
|---|---|---|---|
| 3,893,344 | 7/1975 | Dantlgraber et al. | 74/867 |
| 4,400,164 | 8/1983 | Cadee | 74/867 X |
| 4,417,307 | 11/1983 | Kubo et al. | 74/868 X |
| 4,458,318 | 7/1984 | Smit et al. | 474/18 X |
| 4,458,560 | 7/1984 | Frank et al. | 74/865 X |
| 4,462,275 | 7/1984 | Mohl et al. | 474/18 X |
| 4,470,117 | 9/1984 | Miki et al. | 474/18 X |
| 4,475,416 | 10/1984 | Underwood | 74/868 |
| 4,476,746 | 10/1984 | Miki et al. | 74/867 |

FOREIGN PATENT DOCUMENTS

| | | | |
|---|---|---|---|
| 0094627 | 11/1983 | European Pat. Off. | |
| 138555 | 10/1981 | Japan | 74/867 |
| 153147 | 11/1981 | Japan | 74/867 |
| 161345 | 10/1982 | Japan | 474/28 |
| 161347 | 10/1982 | Japan | 74/865 |
| 2075620 | 11/1981 | United Kingdom | 74/865 |
| 2076084 | 11/1981 | United Kingdom | |

Primary Examiner—Leslie A. Braun
Assistant Examiner—Dwight G. Diehl
Attorney, Agent, or Firm—Parkhurst & Oliff

[57] ABSTRACT

A hydraulic apparatus for a continuously variable transmission by which the rate of changing speed ratios between a driving pulley and a driven pulley is consecutively varied. The apparatus includes a ratio selecting apparatus for changing the speed ratios and a change speed control apparatus for controlling the rate of change of the CVT transmission. The rate of changing the speed ratios is varied by controlling the amount of hydraulic fluid drained through the change speed control apparatus from a hydraulic cylinder, whose pressure is applied to the driving pulley.

22 Claims, 13 Drawing Figures

HYDRAULIC APPARATUS FOR A CONTINUOUSLY VARIABLE TRANSMISSION

BACKGROUND OF THE INVENTION

The present invention relates to a hydraulic apparatus for a continuously variable transmission for motorized vehicles, and more particularly to a hydraulic apparatus which controls speed ratios which can be varied.

A continuously variable transmission, having a V-belt extending between driving and driven pulleys, permits control of the number of revolutions of the driven pulley by varying the size of the V-shaped opening in either the driving pulley, the driven pulley or simultaneously varying both of the pulleys. The size of the V-shaped opening is varied by changing the amount of pressure being fed into a hydraulic cylinder of either of the pulleys. Hence, the effective diameter of the pulley can be varied by changing the amount of pressure being fed into the hydraulic cylinder, thereby allowing for a continuously varying ratio of driving pulley diameter to driven pulley diameter. The V-shaped openings on the driving and driven pulleys are each defined by an area between a fixed pulley and a movable pulley, which is dependent upon the pressure inputted to the hydraulic cylinders. In order to provide hydraulic pressure to each of the movable pulleys, a hydraulic apparatus is provided.

A prior hydraulic apparatus was designed in a manner which allowed hydraulic fluid under a constant predetermined pressure to always be supplied to one movable pulley provided in the apparatus. Additionally, a certain amount of the hydraulic fluid supplied to or drained from the another area, permitted control of the V-shaped opening by varying the amount of hydraulic fluid drained from the apparatus. Through this control, the diameter ratio of the pulleys could be continuously varied, resulting in the speed ratio being able to be continuously varied. However, according to this known hydraulic apparatus, a selector valve was used for the hydraulic cylinder of a movable pulley and was subjected to the following three conditions:

The first condition was that the hydraulic fluid, having a constant predetermined amount of pressure, was supplied to the cylinder of a movable pulley. The second condition was that the hydraulic fluid was drained from the movable pulley. The third condition was that the hydraulic fluid was neither supplied to the cylinder of the movable pulley nor drained from the cylinder of the another movable pulley. According to such a known selector valve, the speed ratio was changed at a uniform speed regardless of whether the speed ratio was increased or decreased. Therefore, the change of the actual speed ratio by the aforementioned selector valve could not promptly follow the required speed ratio needed in order to satisfy specific driving conditions. For example, the responsive change of the speed ratio was not fast enough to meet the changing driving conditions, which resulted in a time delay between the point at which a ratio change was required and when the ratio change actually occurred.

SUMMARY OF THE INVENTION

The present invention was made in view of the foregoing background and to overcome the foregoing drawbacks. An object of this invention is to provide a hydraulic apparatus which rapidly compensates for changing driving conditions by using a continuously variable transmission.

To obtain the above objects, a hydraulic apparatus for a continuously variable transmission, for motorized vehicles having a driving pulley with a fixed member and a movable member, the movable member being actuated by a hydraulic cylinder to form a V-shaped opening therebetween, and having a driven pulley with another fixed member and another movable member, the movable member being similarly actuated by another hydraulic cylinder to form another V-shaped opening therebetween, and a belt member spanning the pulleys so that the diameter of the pulleys can be varied in relation to each other so that different speed ratios may be realized, comprises:

a hydraulic fluid reservoir;

a hydraulic fluid pump for feeding the hydraulic fluid into the hyraulic fluid reservoir;

a regulator valve means for controlling the pressure of the hydraulic fluid pumped by the hydraulic fluid pump, thereby generating a main line pressure, the regulator valve constantly supplying the main line pressure to the hydraulic cylinder of the driven pulley;

ratio selecting means for changing the speed ratios between the driving pulley and the driven pulley; and change speed control means for controlling the speed of the change of speed ratios between the driving pulley and the driven pulley;

the hydraulic cylinder of the driving pulley being supplied with the main line pressure or the hydraulic cylinder being drained through the selecting means and change speed control means, whereby the hydraulic cylinder of the driving pulley is supplied with a line pressure which permits the obtaining of a predetermined speed ratio at any particular prescribed speed of changing the speed ratios.

BRIEF DESCRIPTION OF THE DRAWINGS

The above object, features and advantages of the present invention will become more apparent from reading the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
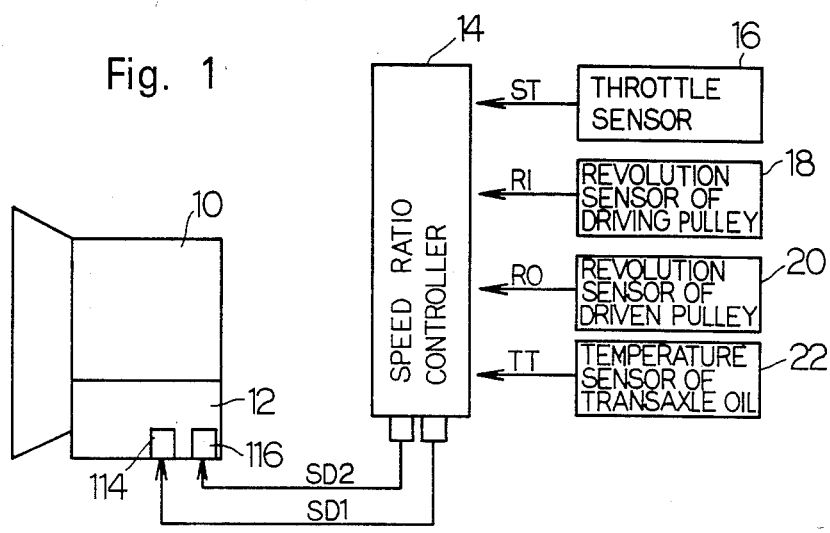
FIG. 1 is a schematic view illustrating a hydraulic apparatus of the present invention.

FIG. 1 illustrates a schematic view of the hydraulic apparatus according to the present invention. The numeral 10 designates a continuously variable transmission mounted on a motorized vehicle and connected to an engine (not shown in the drawings) at one of its ends and to shafts of wheels, through an appropriate gear means, at its other end. The transmission 10 varies the power generated by the engine to the wheels. The speed ratio of the transmission 10 varies according to a hydraulic apparatus 12. Solenoid valves 114 and 116 control the drainage rate of hydraulic fluid from the hydraulic cylinder of the driving pulley in the apparatus 12. The valve 114 is actuated by a signal SD1 from a speed ratio controller 14. The solenoid valve 116 is actuated by a signal SD2 from the speed ratio controller 14. The controller 14 receives the following inputs: a throttle signal ST from a throttle sensor 16, a revolution signal RI from a revolution sensor 18, for detecting the RPM of the driving pulley, a revolution signal RO from another revolution sensor 20, for detecting the RPM of the driven pulley, and a temperature signal TT of a transaxle mounted in the vehicle from a sensor 22 for detecting the temperature of the oil in the transaxle (not shown in drawings).

The controller 14 issues the signals SD1 and SD2 to the solenoid valves 114 and 116, respectively, resulting in a decrease in the difference between the actual revolutions of the driving and driven pulleys and the desired revolutions of the driving and driven pulleys.

Figure 2:
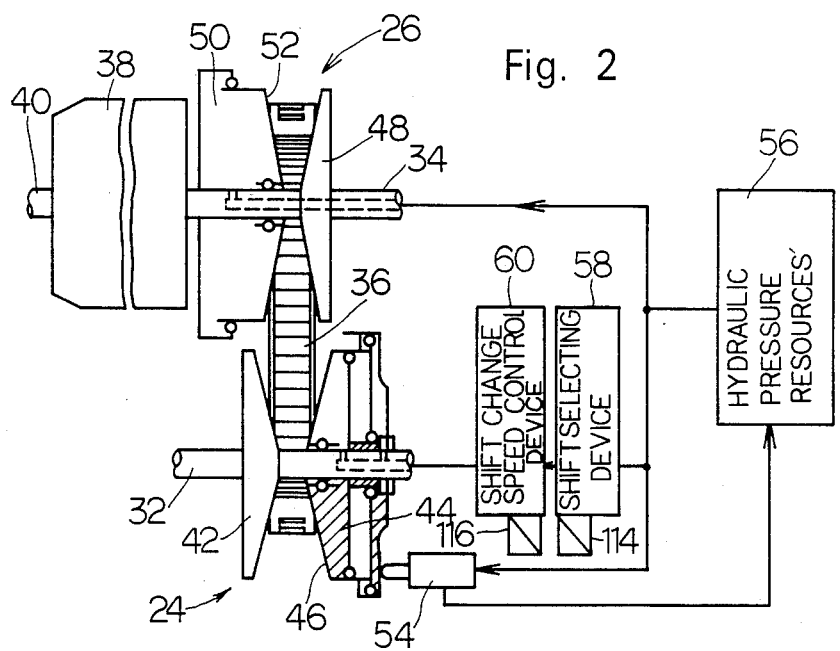
FIG. 2 is an enlarged partially schematic view of the present invention.

The detailed construction of the transmission 10 and the hydraulic apparatus 12 is illustrated in FIG. 2. The continuously variable transmission 10 includes the pulleys 24 and 26. The pulley 24 is a driving pulley mounted on a driving and input shaft 32 which is driven by the engine. The pulley 26 is a driven pulley mounted on a driven and output shaft 34. The torque of the shaft 34 is transmitted through a gear apparatus 38 to another output shaft 40, which connects with the wheels. A torque transmitting belt 36 extends between the driving pulleys 24 and the driven pulley 26. The driving pulley 24 has a member 42 fixed to and rotatable with the input shaft 32, and a member 46 which is axially movable on and rotatable with the input shaft 32. The member 46 can be axially displaced by the pressure of hydraulic cylinder 44 upon it. As a result of the movement of the member 46, the width of the V-shaped opening defined between the members 42 and 44 can be adjusted, thereby changing the effective diameter of the pulley 24.

Similarly, the driven pulley 26 has a member 48 fixed to and rotatable with the driven shaft 34, and a member 52 which is axially movable on and rotatable with the driven shaft 34. The member 52 can be axially displaced by the pressure of hydraulic cylinder 50 upon it. Consequently, the width of the V-shaped opening defined between the members 48 and 52 can be adjusted, thereby changing the effective diameter of the pulley 26.

The cylinder 44 of the driving pulley 24 is equipped with double pistons, while the cylinder 50 is equipped with a single piston. Hence, the pressure in the cylinder 44 is larger than the pressure in the cylinder 50, even if a similar pressure is inputted to both of the cylinders 44 and 50.

The hydraulic apparatus 12 contains a hydraulic pressure resource 56 for generating fluid with a specific line pressure, a ratio selecting device 58 and a change speed control device 60. A constant line pressure is supplied to the cylinder 50 of the driven pulley 26 and the sensing valve 54. The sensing valve 54 is provided to detect the axial displacement of the movable member 46 of the driving pulley 24 and hence the effective diameter of the driving pulley 24. The aforementioned hydraulic resources 56, illustrated in detail in FIGS. 3-6, includes a pump device 62, a line pressure regulator valve 64, a throttle valve 66, a lubricating oil cooler 68 and a cooler pressure regulating valve 70. The resource 56 generates a line pressure, which is regulated according to the degree of opening of the throttle valve 66 and the speed ratio, through an oil passage 72, to the ratio selecting device 58, the change speed control device 60 and the sensing valve 54.

The sensing valve 54 has a spool 74 and a sensing piston 76 which has an end portion in contact with the movable member 46 of driving pulley 24. A spring 75 is provided between the spool 74 and piston 76, and biases the piston 76 toward the movable member 46. Hence, the piston 76 can be displaced against the biasing force of the spring by an axial displacement of the movable member 46 applied against the biasing force of the spring 75.

Figure 7:
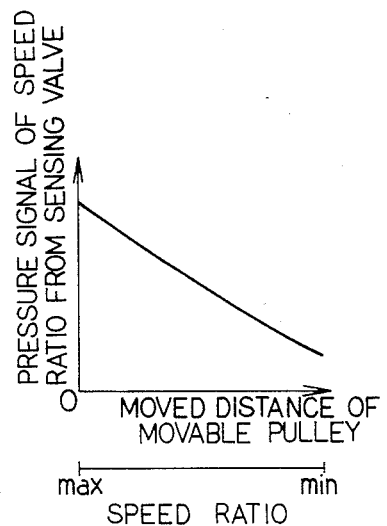
FIG. 7 is a diagram showing the relationship between a pressure signal of the speed ratio outputted from a sensing valve and the a displacement of the movable pulley.
Figure 8:
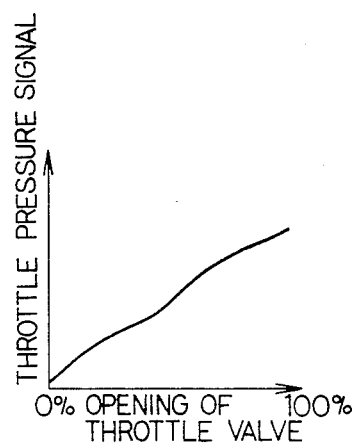
FIG. 8 is a diagram showing the relationship between a throttle pressure signal of the throttle valve and the percent opening of the throttle valve.
Figure 9:
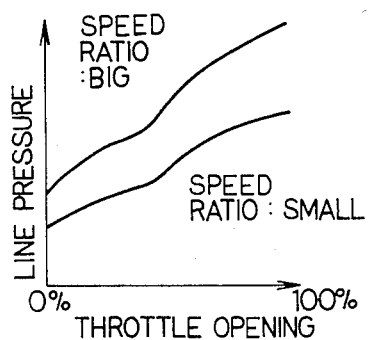
FIG. 9 is a diagram showing the relationship between a line pressure regulated by the line pressure regulator valve and the opening of the throttle valve, for two different speed ratios.

Any movement of the piston 76 is transmitted to the spool 74 and thereby controls the amount of oil coming from inlet port 78 and going to the drain port 73. Hence, the hydraulic fluid having a pressure which is proportioned to the speed ratio, as shown in FIG. 7, is supplied from the outlet port 80 of the sensing valve 54 to an inlet port 82 of the line pressure regulator valve 64.

The throttle valve 66 has a spool 84 and a piston 90, which has an end portion in contact with a cam plate 86, the cam plate being rotated by the stroke of an accelerator pedal. The movememt of the accelerator pedal is transmitted to the spool 84, through a spring 88, provided between the spool 84 and the piston 90. The line pressure supplied into an inlet port 92 of the throttle valve 66 is controlled by changing the opening area of a drain port 93. The throttle pressure supplied from an outlet port 94, to an inlet port 96, of the line pressure regulator valve 64, is proportional to the stroke of the throttle pedal.

The line pressure regulator valve 64 has a spool 98, a valve plunger 100 and a spring 99, provided between the spool 98 and the plunger 100. The plunger 100 has lands 100a and 100b. The area of the land 100a is designed to be larger than that of the land 100b. The throttle pressure supplied from the port 96, is exerted upon the land 100b and upwardly biases the plunger 100 against the force of spring 99. Further, the pressure supplied from the port 82 works on the lands 100a and 100b in an amount proportional to the speed ratio. Because the area of the land 100a is larger than that of the land 100b, the plunger 100 is upwardly biased because of the differential in hydraulic force between the lands 100a and 100b. The main fluid supplied from a pump 106 to a port 102, is regulated by changing the amount of hydraulic fluid drained from a port 101. Thus the line pressure is regulated and fed into the hydraulic fluid passage 72. The line pressure is continuously supplied through the hydraulic fluid passage 72 to the hydraulic cylinder 50 of the driven pulley 26. In order to decrease the amount of engine power loss, a minimum value of the line pressure is predetermined. The minimum value of the line pressure reduces engine power while maintaining a torque necessary to keep the belt 36 from slipping while rotating around the driving pulley 24 and the driven pulley 26.

The pump device 62 includes a pump means 106 for supplying the hydraulic fluid in a reservoir 108, to the line pressure regulator valve 64, and a relief valve 110. The relief valve 110 has a check ball 110a and a spring 110b. The spring 110b biases the ball 110a in a manner which results in an opening 110c being closed.

Figure 3:
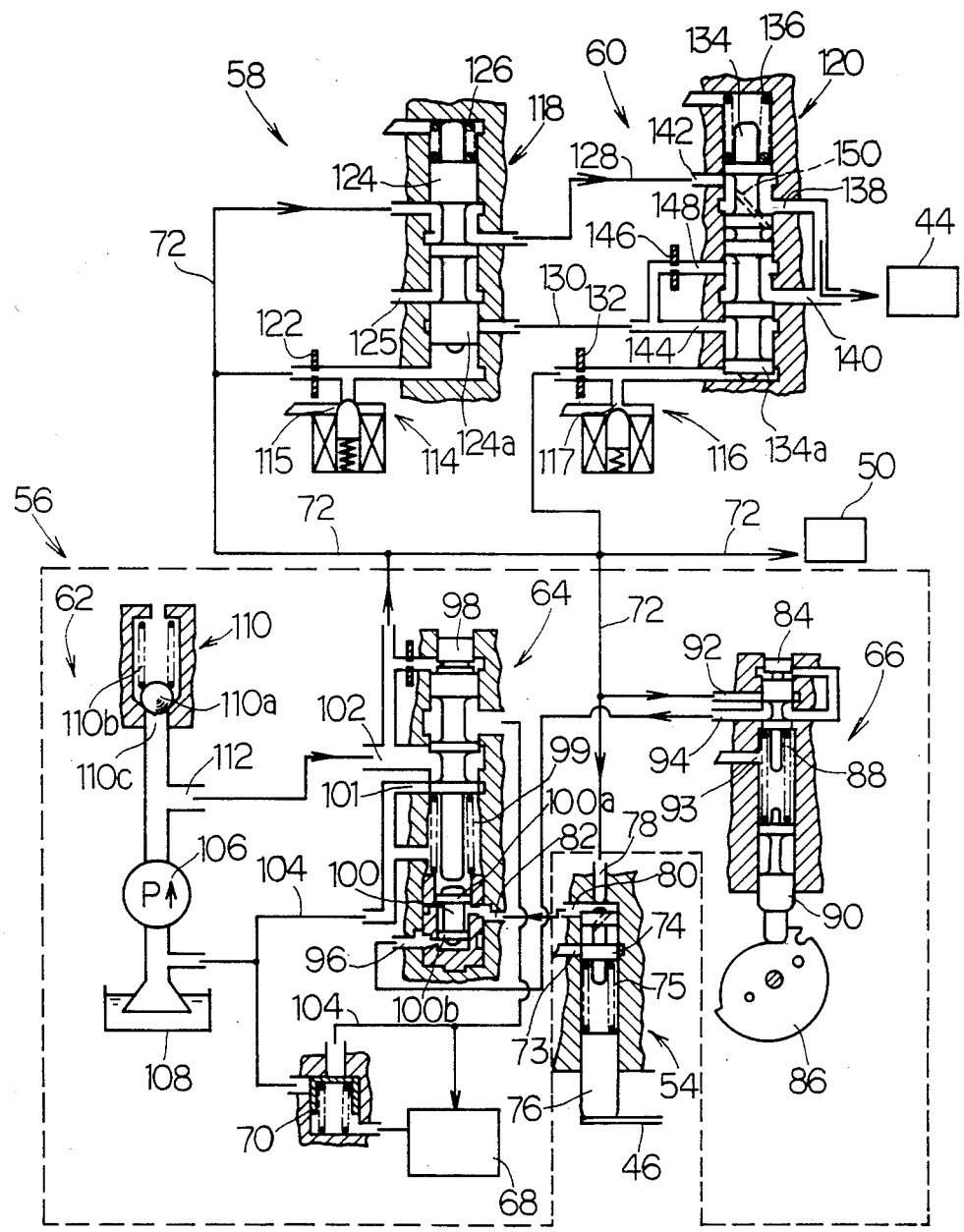
FIG. 3 is a partial view of a hydraulic circuit of the hydraulic apparatus of the present invention showing a condition where the needed speed ratio change is of a small value.
Figure 5:
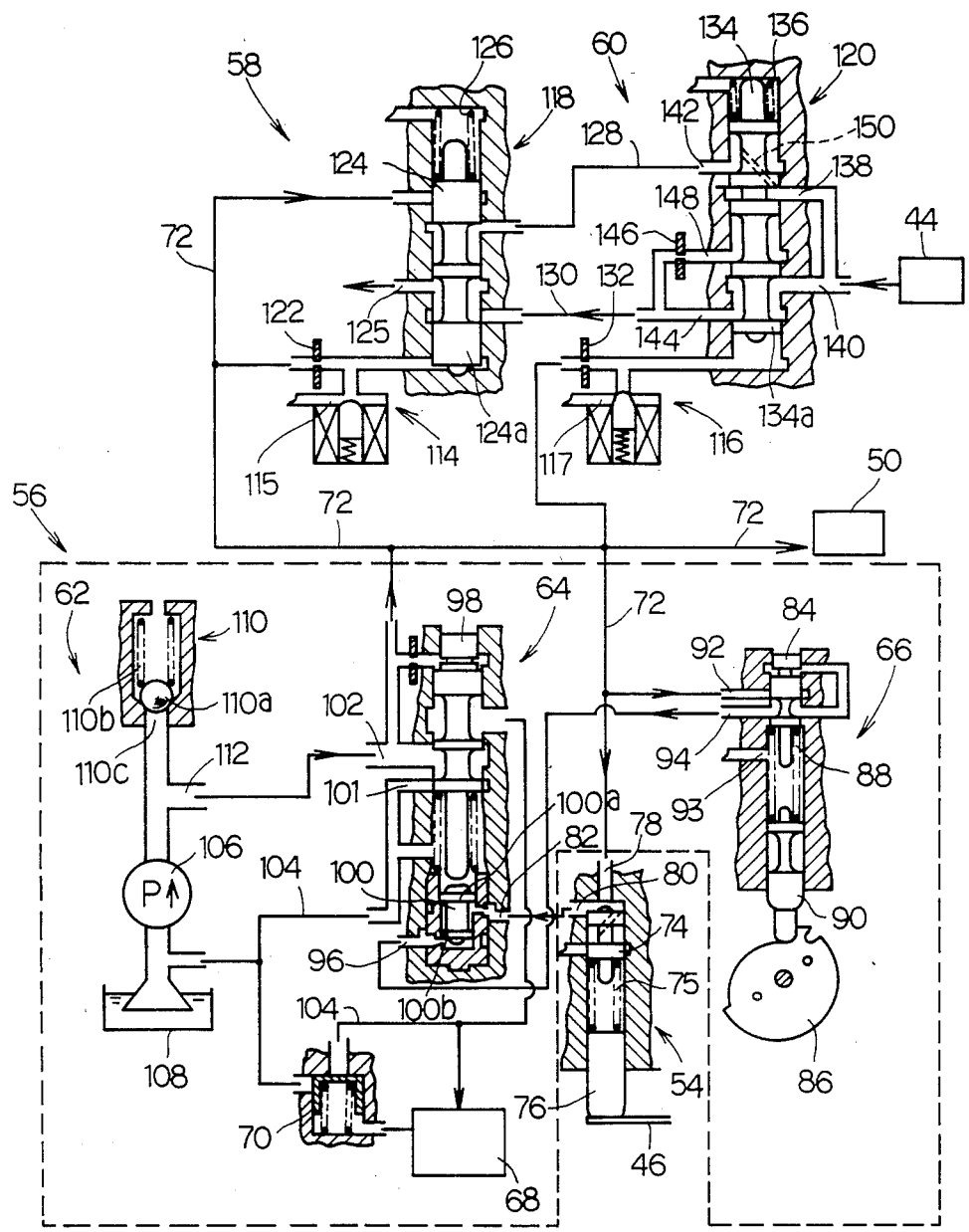
FIG. 5 is a view of a hydraulic circuit of the hydraulic apparatus of the present invention showing a condition where the needed speed ratio change will occur at a high rate, and is of a large value.

The ratio selecting device 58 includes a spool valve 118. The line pressure is supplied through a passage 72 into the solenoid valve 114. An orifice 122 is provided on a passage which is separate from the oil passage 72 and goes to the solenoid valve 114. When the solenoid valve 114 is not energized, it closes a drain port 115, as shown in FIG. 3. The line pressure exerts a force on a land 124a of the spool 124 to move the spool 124 against the force of a spring 126, which is provided between the spool 124 and the valve housing. Under these conditions, the passage 72 is connected with a passage 128. However, when the drain port 115 is opened, as a result of the solenoid valve 114 being energized, the line pressure does not exert a force on the land 124a of the spool 124. Consequently, the spool 124 is downwardly displaced from the condition shown in FIG. 3, by the force of the spring 126, to the condition shown in FIG. 5. The displacement of the spool 124 results in the passages 72 and 128 becoming disconnected, as shown in FIG. 5, and the passage 130 becomes connected with the drain passage 125, also shown in FIG. 5. Thus, the spool 124 has two different functional positions because of the operation of the solenoid valve 114.

Figure 4:
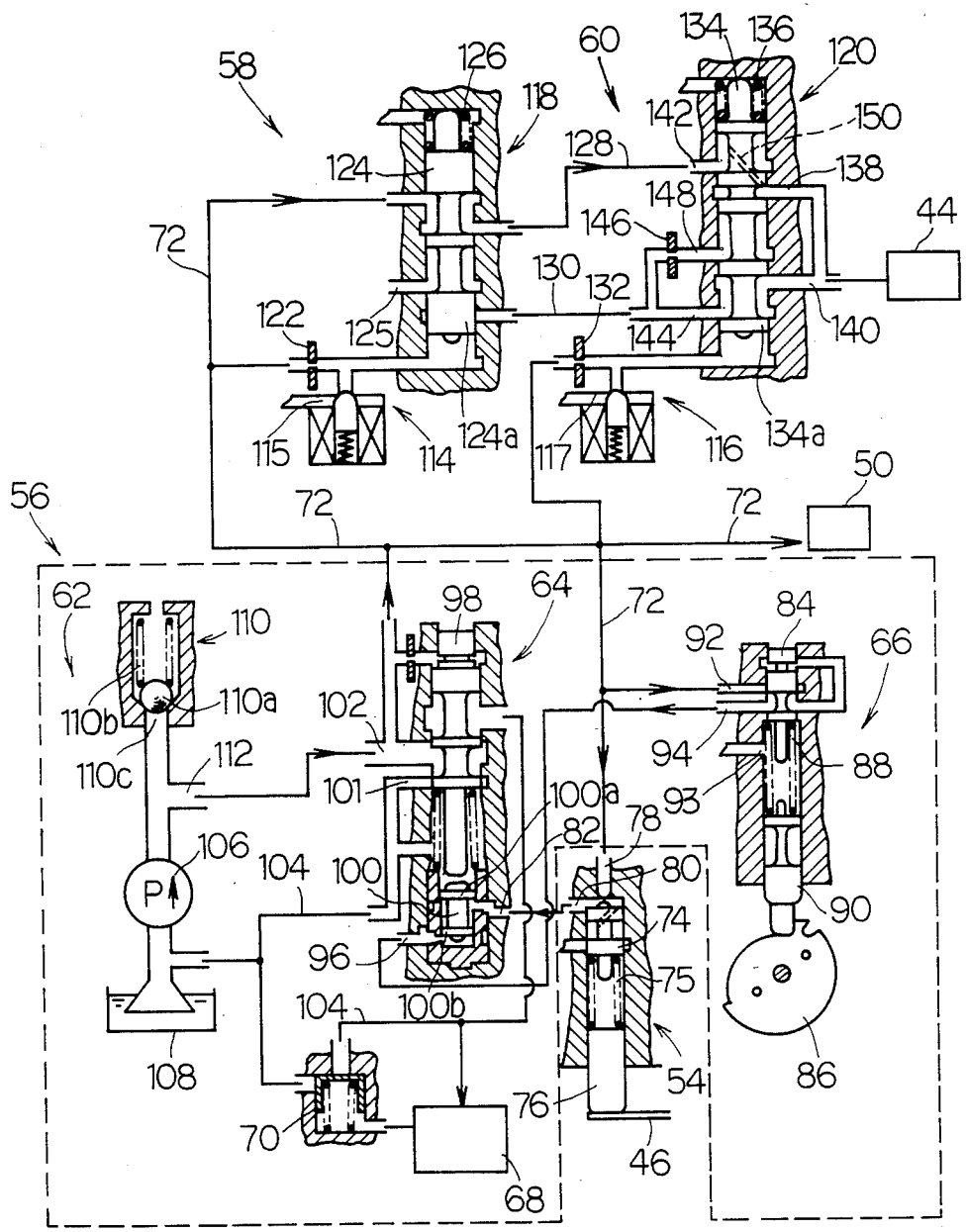
FIG. 4 is a partial view of a hydraulic circuit of the hydraulic apparatus of the present invention showing a condition where the change of the speed ratio has stopped.

The change speed control device 60 includes a spool valve 120. An orifice 132 is provided between the oil passage 72 and the spool valve 120. Further, a solenoid valve 116 is provided between the orifice 132 and the spool valve 120. When the solenoid valve 116 is not energized, it moves toward its closed position, as shown in FIG. 4, and the line pressure in the oil passage 72 is supplied to a land 134a on the spool valve 120. This results in the spool valve 134 being biased against the force of a spring 136. The spool valve 120 includes a first and second outlet ports 138 and 140, both of which are connected with the hydraulic cylinder 44 of the driving pulley 24. A port 142 is connected with a passage 128. A drain port 144 is connected with a drain passage 130 and a port 148 through an orifice 146.

When the drain port 117 of the solenoid valve 116 is opened, because of the excitation of the solenoid valve, the line pressure is not exerted upon the area 134a of the spool 134. As a result, the spool 134 is downwardly biased by the force of the spring 136, from the condition shown in FIG. 4 to the condition shown in FIG. 3. The displacement of the spool 134 results in a connection between the first and second outlet ports 138 and 140, respectively, and the supply ports 142 and 148, and the connection between the second outlet port 140 with the drain port 144 is terminated.

A cooling means 68 for cooling the hydraulic fluid is provided between the fluid reservoir 108 and the regulataor valve 64. A valve 70 is provided for controlling the pressure of the lubricating oil within the cooler 68.

The recited apparatus fucntions as follows, when the signal SD1 does not energize the solenoid valve 114 and the signal SD2 energizes the solenoid valve 116, as shown in FIG. 3, the spool 124 of the ratio selecting device 58 is upwardly displaced by the pressure exerted by the hydraulic fluid in the line against the land 124a, thereby overcoming the biasing force of the spring 126. At the same instant, the spool 134 of the change speed control device 60 is downwardly displaced by the biasing force of the spring 136, from the condition shown in FIG. 4 to the condition shown in FIG. 3. Consequently, the oil in the passage 72 is promptly supplied through the spool valve 118 by the passage 123, and into the spool valve 120 through the inlet port 142 and through the outlet port 138 to the hydraulic cylinder 44 of the driving pulley 24. Due to this prompt supply, the movable member 46 of the driving pulley 24 is displaced toward the fixed member 42, thereby increasing the effective diameter of the diving pulley 24 and decreasing the speed ratio.

Conversely, when the signal SD2 does not energize the solenoid valve 116 and the signal SD1 still does not energize the solenoid valve 114, as shown in FIG. 4, the line pressure exerts a force on the land 134a of the spool 134 of the change speed control device 60, resulting in the spool 134 being upwardly displaced against the force of the spring 136, as shown in FIG. 4. As a result, the connection between the ports 142 and 138 is disconnected, resulting in the line pressure not being fed into the hydraulic cylinder 44 of the driving pulley 24. Hence, the displacement of the movable member 46 of the driving pulley 24 is stopped and consequently, the changing of the speed ratio also stops.

Figure 10:
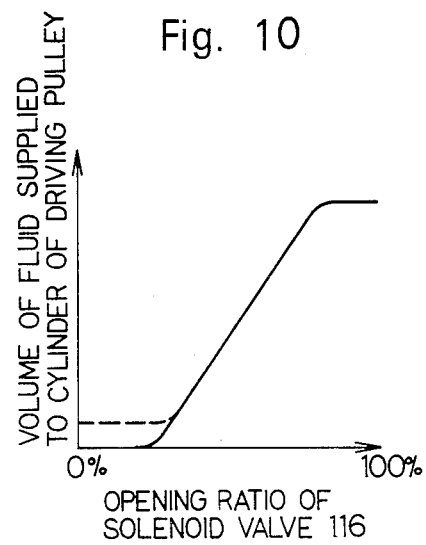
FIG. 10 is a diagram showing the relationship between the volume of hydraulic fluid supplied to the cylinder of the driving pulley and the opening ratio of the solenoid valve 116.

The solenoid valve 116 is constructed so that it may be alternatively turned ON or OFF at a predetermined frequency to control the amount of fluid being supplied to the hydraulic cylinder 44 of the driving pulley 24. According to the change in frequency between the ON and OFF positions, the amount of fluid supplied to the hydraulic cylinder 44 of the driving pulley 24 is varied, as shown in FIG. 10. Therefore, the amount of fluid supplied to the cylinder 44 of the driving pulley can be constantly and consecutively varied. In FIG. 10, the ratio 100% corresponds to the condition of the solenoid valve 116 being fully opened.

Additionally, when the solenoid valve 114 is energized by the signal SD1, the line pressure exerted on the spool 124 of the ratio selecting device 58 is drained from the port 115. Therefore, the spool 124 of the ratio selecting device 58 is downwardly displaced by the force of the spring 126 from the condition shown in FIG. 4 to the condition shown in FIG. 5. A result of this displacement is that the passage 130 becomes connected with the drain passage 125. Under these conditions, when the signal SD2 is not fed into the solenoid valve 116, the line pressure is supplied through the orifice 132 to the land 134a of the spool 134 as shown in FIG. 5. Hence, the spool 134 is upwardly displaced, against the biasing force of the spring 136, resulting in the hydraulic fluid supplied to the hydraulic cylinder 44 of the driving pulley 24 being promptly drained through the spool valve 120 by the drain port 144 and the drain passage 130, through the spool valve 118 and exiting through the drain port 125. The drainage results in the movable member 46 of the driving pulley 24 being moved away from the fixed member 41, thereby decreasing the effective diameter of the driving pulley 24 and increasing the speed ratio at a high rate of change.

Figure 6:
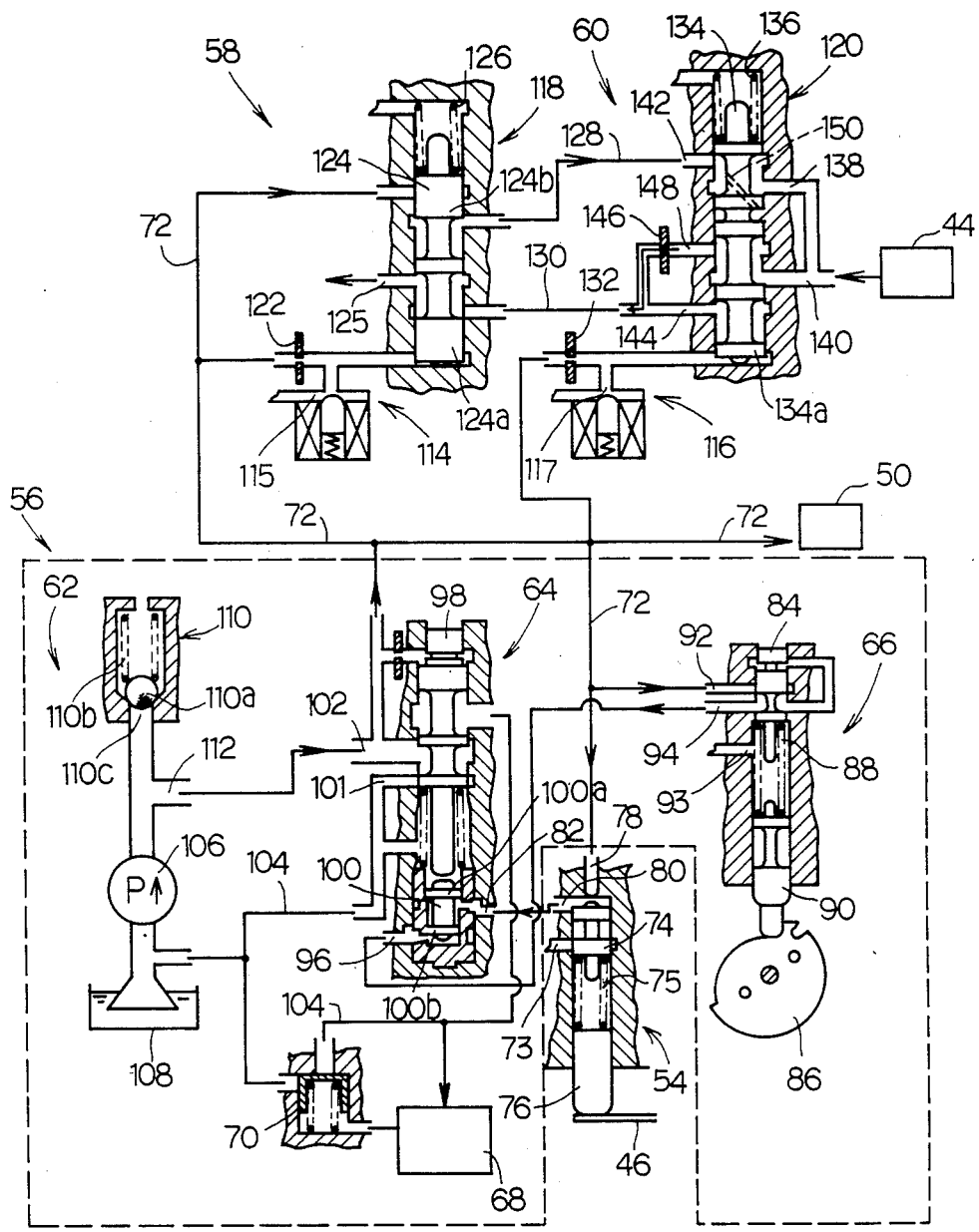
FIG. 6 is a partial view of a hydraulic circuit of the hydraulic apparatus of the present invention showing a condition where the needed speed ratio change will occur at a slow rate, and is of a large value.
Figure 11:
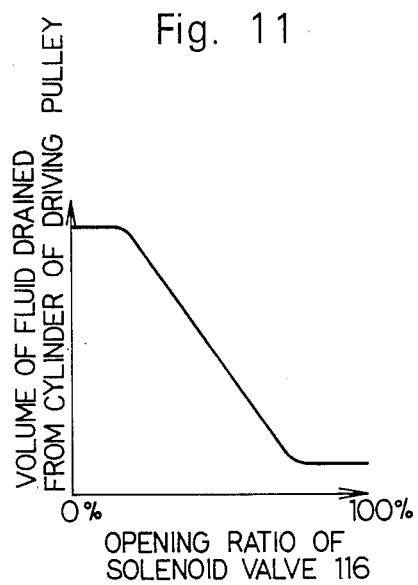
FIG. 11 is a diagram showing the relationship between the volume of hydraulic fluid drained from the cylinder of the driving pulley and the opening ratio of the solenoid valve.

Additionally, when the signal SD2 energizes the solenoid valve 116, with the signal SD1 energizing the solenoid valve 114, the spool 134 of the change speed control device 60 is displaced in the direction of the biasing force of the spring 136, from the condition shown in FIG. 5. to the condition shown in FIG. 6. The hydraulic fluid in the hydraulic cylinder 44 of the driving pulley 24 is drained through an orifice 146, into the passage 130 leading into the spool valve 118 and exiting through the drain port 125. Under these conditions, the drainage of the hydraulic fluid is restricted at the orifice 146, and the rate at which the speed ratio change is slow. When the solenoid valve 116 is actuated at a predetermined frequency between the conditions of ON and OFF, the quantity of the hydraulic fluid drained from the hydraulic cylinder 44 of the driving pulley 24 is consecutively decreased, as shown in FIG. 11. In other words, the rate of changing the speed ratio is consequently controlled by selecting the ratio of the solenoid valve 116 from ON to OFF.

Hence, according to the aforementioned embodiment, the rate of changing the speed ratio is controlled by two separate stages by high or low rates of change or no change at each condition of increasing or decreasing the speed ratio. Moreover, controlling the above two stages is accomplished by the control operation of the solenoid valve 116 being actuated to either an ON or OFF position at some predetermined frequency, and the frequency ratio between the ON and OFF positions of the solenoid valve 116 can be varied.

According to the present embodiment of the invention, when the solenoid valves 114 and 116 are in their respective OFF positions, as shown in FIG. 4, the hydraulic fluid in the cylinder 44 of the driving pulley 24 is not drained because the outlet ports 138 and 140 are disconnected with the ports 142 and 144, respectively, by the lands of the spool 134. Conversely, when the solenoid valves 114 and 116 are both in their respective ON positions, ON as shown in FIG. 6, the port 138 of the spool valve 120 is connected with the passage 128, but the passage 128 is disconnected with the passage 72 by the land 124b of the spool 124. Because the hydraulic fluid having the predetermined line pressure is not fed into the hydraulic cylinder of driving pulley 44, in either of the above conditions, the abrupt change of speed ratios, caused by the difficulties associated with the solenoid valves, can be obviated.

According to the another embodiment of the present invention, a small hole 150 is provided in the spool 134, as shown by the broken line in FIGS. 3 through 6. When the spool 134 is upwardly displaced against the force of the spring 136, by the line pressure applied to the land 134a, a small quantity of hydraulic fluid can flow between the ports 138 and 142. As a result, when the solenoid valve 114 is OFF and the solenoid valve 116 is ON, this small amount of fluid is supplied to the hydraulic cylinder 44 of the driving pulley 24 at a zone where the ratio of ON to OFF of the solenoid valve 116 is a small value, as represented by the broken line in FIG. 10. Because of this supply of fluid, the decreasing of the speed ratio is slowed.

Figure 12:
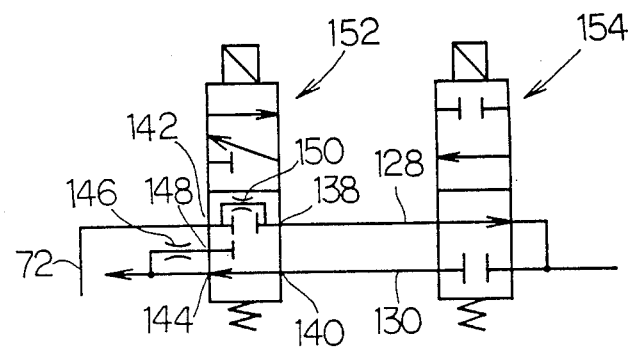
FIG. 12 is a schematic drawing of a solenoid valve.

Referring next to FIG. 12, there is illustrated another embodiment of the present invention. In this embodiment, a solenoid valve 152, which has the same functions as those of the spool valve 120, is provided at the position of spool valve 118. Further, another solenoid valve 154, which has the same functions as those of the spool valve 118, is provided at the position of the spool valve 120. The other construction is the same as that of the first embodiment.

Figure 13:
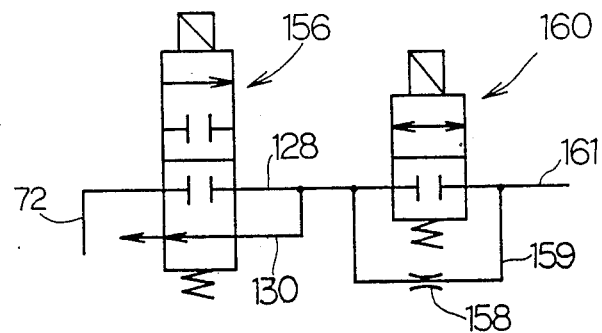
FIG. 13 is a schematic drawing of a solenoid valve.

FIG. 13 shows another embodiment of the present invention. In lieu of the ratio selecting device 58, a solenoid valve 156 is provided which selectively connects the passage 128 with the passage 130. Moreover, a solenoid valve 160, for selectively connecting the passage 128 with the passage 161, is provided between the solenoid valve 156 and the hydraulic cylinder 44 of the driving pulley 24. A bypass passage 158 is provided between the passages 128 and 161. The passage 159 is provided with an orifice 158. The passage 161 is connected with the cylinder 44 of the driving pulley 24.

In the above embodiments, all of the valves 64, 66, 54, 118 and 120 may be provided in a unitary housing, if necessary.

While the present invention has been described in its preferred embodiments, it is to be understood that the invention is not limited thereto, and may be otherwise embodied within the scope of the following claims.

What is claimed is:

1. A hydraulic apparatus for a continuously variable transmission for motor vehicles having a driving pulley with a fixed member and a movable member, the movable member being actuated by a hydraulic cylinder to form a V-shaped opening therebetween, a driven pulley with another fixed member and another movable member, said another movable member being similarly actuated by another hydraulic cylinder to form another V-shaped opening therebetween, and a belt member spanning said pulleys, comprising:
   a hydraulic fluid reservoir containing hydraulic fluid;
   a hydraulic fluid pump for pumping the hydraulic fluid from the reservoir;
   regulator valve means for controlling the value of a line pressure of the hydraulic fluid pumped by the hydraulic fluid pump, whereby the regulator valve means generates a line pressure;
   ratio selecting means for changing the speed ratios between the driving pulley and the driven pulley, said ratio selecting means comprising;
   a first valve having a first and a second land;
   a first inlet passage supplied with the hydraulic fluid from the hydraulic fluid pump;
   a second inlet passage supplied with the hydraulic fluid from the hydraulic fluid pump, the hydraulic fluid being exerted on the second land;
   a first controlling means connected with the second inlet passage, the first controlling means supplying the hydraulic fluid to the second land or draining the hydraulic fluid in the second inlet passage;

a first outlet passage connected with the first inlet passage when the hydraulic fluid is supplied onto the second land, the first outlet passage being disconnected with the first inlet passage when the hydraulic fluid is not supplied onto the second land;

a second outlet passage communicating with a drain passage when the hydraulic fluid is not supplied onto the second land; and change speed control means for controlling the speed of changing speed ratios between the driving pulley and the driven pulley, said change speed control means comprising, a second valve having a third and a fourth land;

a third inlet passage communicated with the first outlet passage;

a fourth inlet passage supplied with the hydraulic fluid from the hydraulic fluid pump, the hydraulic fluid being exerted on the fourth land;

a second controlling means connected with the fourth inlet passage, the second controlling means supplying the hydraulic fluid to the fourth land or draining the hydraulic fluid in the fourth inlet passage;

a third outlet passage connected with the cylinder of the driving pulley, the third outlet passage draining the fluid from the cylinder of the driving pulley therethrough, or being disconnected with a drain passage when the hydraulic fluid is not supplied to the fourth land; and a second biasing means for biasing the third land in the direction to communicate the third inlet passage with the third outlet passage.

2. The hydraulic apparatus of claim 1, further comprising a throttle means for generating a throttle signal corresponding to a stroke of an accelerator pedal; and a sensing means for detecting the effective diameter of the driving pulley, the sensing means generating a signal corresponding to an actual speed ratio, whereby the throttle and speed ratio signals are inputted into the regulator valve means which regulates the value of the line pressure.

3. The hydraulic apparatus of claim 1, wherein the first controlling means of said ratio selecting means comprises a first solenoid valve for controlling the line pressure supplied to the second land of the first valve.

4. The hydraulic apparatus of claim 1, wherein the second controlling means of said change speed control means comprises the second solenoid valve for controlling the line pressure supplied to the fourth land of the second valve.

5. The hydraulic apparatus of claim 3, wherein the first solenoid valve is opened and closed at a predetermined frequency to control the amount of hydraulic fluid supplied to or drained from the change speed control means.

6. The hydraulic apparatus of claim 4, wherein the second solenoid valve is opened and closed at a predetermined frequency to control the amount of hydraulic fluid supplied to or drained from the hydraulic cylinder of the driving pulley.

7. The hydraulic apparatus of claim 4, wherein the second valve further includes a hole radially extending therethrough.

8. A hydraulic apparatus for a continuously variable transmission for motor vehicles having a driving pulley with a fixed member and a movable member, the movable member being actuated by a hydraulic cylinder to form a V-shaped opening therebetween, a driven pulley with another fixed member and another movable member, said another movable member being similarly actuated by another hydraulic cylinder to form another V-shaped opening therebetween, and a belt member spanning said pulleys, comprising:

a hydraulic fluid reservoir containing hydraulic fluid;

a hydraulic fluid pump for pumping the hydraulic fluid from the reservoir;

regulator valve means for controlling the pressure of the hydraulic fluid pumped by the hydraulic fluid pump, whereby the regulator valve means generates a line pressure;

throttle means for generating a throttle signal corresponding to a stroke of an accelerator pedal, the throttle means supplying the throttle signal to the regulator valve to control the value of the generated line pressure;

sensing means for detecting the effective diameter of the driving pulley, the sensing means generating a signal corresponding to an actual speed ratio and supplying the signal into the regulator valve means to control the value of the generated line pressure;

ratio selecting means for changing the speed ratio between the driving pulley and the driven pulley, the ratio selecting means comprising;

a first valve having a first and second land;

a first inlet passage supplied with the hydraulic fluid from the hydraulic fluid pump;

a second inlet passage supplied with the hydraulic fluid from the hydraulic fluid pump, the hydraulic fluid being exerted on the second land;

a first controlling means connected with the second inlet passage, the first controlling means supplying the hydraulic fluid to the second land or draining the hydraulic fluid in the second inlet passage;

a first outlet passage connected with the first inlet passage when the hydraulic fluid is supplied onto the second land, the first outlet passage being disconnected with the first inlet passage when the hydraulic fluid is not supplied onto the second land;

a second outlet passage communicating with a drain passage when the hydraulic fluid is not supplied onto the second land; and a first biasing means for biasing the first land in the direction to disconnect the communication between the first inlet passage and the first outlet passage; and change speed control means for controlling the speed of changing speed ratios between the driving pulley and the driven pulley, the change speed control means comprising:

a second valve having a third and a fourth land;

a third inlet passage communicated with the first outlet passage;

a fourth inlet passage supplied with the hydraulic fluid from the hydraulic fluid pump, the hydraulic fluid being exerted on the fourth land;

a second controlling means connected with the fourth inlet passage, the second controlling means supplying the hydraulic fluid to the fourth land or draining the hydraulic fluid in the fourth inlet passage;

a third outlet passage connected with the cylinder of the driving pulley, the third outlet passage draining the fluid from the cylinder of the driving pulley therethrough, or being disconnected with a drain passage when the hydraulic fluid is not supplied to the fourth land; and a second biasing means for biasing the third land in the direction to communicate the third inlet passage with the third outlet passage.

9. The hydraulic apparatus of claim 8, wherein the second controlling means of said change speed control means is opened and closed at a predetermined frequency to control the amount of hydraulic fluid supplied to or drained from the hydraulic cylinder of the driving pulley.

10. The hydraulic apparatus of claim 8, wherein the second valve further includes a hole radially extending therethrough.

11. A hydraulic apparatus for a continuously variable transmission for motor vehicles having a driving pulley with a fixed member and a movable member, the movable member being actuated by a hydraulic cylinder to form a V-shaped opening therebetween, a driven pulley with another fixed member and another movable member, said another movable member being similarly actuated by another hydraulic cylinder to form another V-shaped opening therebetween, and a belt member spanning said pulleys, comprising:

a hydraulic fluid reservoir containing hydraulic fluid;

a hydraulic fluid pump for pumping the hydraulic fluid from the reservoir;

ratio selecting valve means for changing the speed ratios between the driving pulley and the driven pulley, the ratio selecting means comprising, a valve having a first and a second land;

a first inlet passage supplied with the hydraulic fluid from the hydraulic fluid pump;

a second inlet passage supplied with the hydraulic fluid from the hydraulic fluid pump, the hydraulic fluid being exerted on the second land;

a controlling means connected with the second inlet passage, the controlling means supplying the hydraulic fluid to the second land or draining the hydraulic fluid in the second inlet passage;

a first outlet passage connected with the first inlet passage when the hydraulic fluid is supplied onto the second land, the first outlet passage being disconnected with the first inlet passage when the hydraulic fluid is not supplied onto the second land;

a second outlet passage communicating with a drain passage when the hydraulic fluid is not supplied onto the second land; and a biasing means for biasing the first land in the direction to disconnect the communication between the first inlet passage and the first outlet passage; and change speed control valve means for controlling the speed of changing speed ratios between the driving pulley and the driven pulley.

12. A hydraulic apparatus for a continuously variable transmission for motor vehicles having a driving pulley with a fixed member and a movable member, the movable member being actuated by a hydraulic cylinder to form a V-shaped opening therebetween, a driven pulley with another fixed member and another movable member, said another movable member being similarly actuated by another hydraulic cylinder to form another V-shaped opening therebetween, and a belt member spanning said pulleys, comprising:

a hydraulic fluid reservoir containing hydraulic fluid;

a hydraulic fluid pump for pumping the hydraulic fluid from the reservoir;

ratio selecting valve means for changing the speed ratio between the driving pulley and the driven pulley; and change speed control valve means for controlling the speed of changing speed ratios between the driving pulley and the driven pulley, the change speed control means comprising;

a valve having a first and a second land;

a first inlet passage supplied with the hydraulic fluid from the hydraulic fluid pump;

a second inlet passage supplied with the hydraulic fluid from the hydraulic fluid pump, the hydraulic fluid being exerted on the second land;

a controlling means connected with the second inlet passage, the controlling means supplying the hydraulic fluid to the second land or draining the hydraulic fluid in the second inlet passage;

an outlet passage connected with the cylinder of the driving pulley, the outlet passage draining the fluid of the cylinder of the driving pulley therethrough when the hydraulic fluid is not supplied to the second land, or being disconnected with the first inlet passage when the hydraulic fluid is not supplied to the second land; and a first biasing means for biasing the first land in the direction to communicate the first inlet passage with the outlet passage.

13. A hydraulic apparatus for a continuously variable transmission for motor vehicles having a driving pulley with a fixed member and a movable member, the movable member being actuated by a hydraulic cylinder to form a V-shaped opening therebetween, a driven pulley with another fixed member and another movable member, said another movable member being similarly actuated by another hydraulic cylinder to form another V-shaped opening therebetween, and a belt member spanning said pulleys, comprising:

a hydraulic fluid reservoir containing hydraulic fluid;

a hydraulic fluid pump for pumping the hydraulic fluid from the reservoir;

ratio selecting means for changing the speed ratios between the driving pulley and the driven pulley, the ratio selecting means comprising;

a valve having a first and a second land;

a first inlet passage supplied with the hydraulic fluid from the hydraulic fluid pump;

a second inlet passage supplied with the hydraulic fluid from the hydraulic fluid pump, the hydraulic fluid being exerted on the second land;

a first controlling means connected with the second inlet passage, the first controlling means supplying the hydraulic fluid to the second land or draining the hydraulic fluid in the second inlet passage;

a first outlet passage connected with the first inlet passage when the hydraulic fluid is supplied onto the second land, the first outlet passage being disconnected with the first inlet passage when the hydraulic fluid is not supplied onto the second land;

a second outlet passage being communicated with a drain passage when the hydraulic fluid is not supplied onto the second land; and a first biasing means for biasing the first land in the direction to disconnect the communication between the first inlet passage and the first outlet passage; and change speed control means for controlling the speed of changing speed ratios between the driving pulley and the driven pulley, the change speed control means comprising;
 a valve having a third and a fourth land;
 a third inlet passage communicated with the first outlet passage;
 a fourth inlet passage supplied with hydraulic fluid from the hydraulic fluid pump, the hydraulic fluid being exerted on the fourth land;
 a second controlling means connected with the fourth inlet passage, the second controlling means supplying the hydraulic fluid to the fourth land or draining the hydraulic fluid in the fourth inlet passage;
 a third outlet passage connected with the cylinder of the driving pulley, the third outlet passage draining the fluid of the cylinder of the driving pulley therethrough, or being disconnected with a drain passage when the hydraulic fluid is not supplied to the fourth land; and
 a second biasing means for biasing the third land in the direction to communicate the third inlet passage with the third outlet passage.

14. The hydraulic apparatus of claim 13, wherein the hydraulic fluid is supplied through the first inlet passage, the first outlet passage and the third outlet passage to the cylinder of the driving pulley when the hydraulic fluid is exerted on the second land and not exerted on the fourth land.

15. The hydraulic apparatus of claim 14, wherein the hydraulic fluid is not supplied to the cylinder of the driving pulley or drained from the cylinder of driving pulley when the hydraulic fluid is exerted on the second and fourth lands.

16. The hydraulic apparatus of claim 13, wherein the hydraulic fluid of the cylinder of the driving pulley is drained through the third outlet passage and the second outlet passage when the hydraulic fluid is only exerted on the fourth land.

17. The hydraulic apparatus of claim 16, wherein the hydraulic fluid of the driving pulley is gradually drained when the hydraulic fluid is exerted on neither the second land nor the fourth land.

18. A hydraulic control system for controlling speed ratios of a hydraulically-operated continuously variable transmission for a vehicle, having an input shaft operatively connected to an engine of the vehicle, an output shaft operatively connected to driving wheels of the vehicle, a pair of diameter-variable pulleys mounted on each of the input shaft and output shaft, a torque transmission belt connecting the diameter-variable pulleys to each other, and a pair of hydraulic cylinders for changing effective diameters of the pulleys, the hydraulic control system comprising:
 a ratio selecting means associated with at least one of said pair of hydraulic cylinders, the ratio selecting means comprising first and second solenoids being selectively placed in one of three operation states consisting of a first state in which a pressurized fluid is fed into at least one of said hydraulic cylinders, a second state in which the pressurized fluid is discharged from at least one of said pair of hydraulic cylinders, and a third state in which the flow of the pressurized fluid is restricted at the time when the pressurized fluid is fed into or discharged from at least one of said pair of hydraulic cylinders;
 a first valve assembly including said first solenoid therein, and a second valve assembly including said second solenoid therein, said first valve assembly being actuated by said first solenoid to obtain a feed position for feeding the pressurized fluid to at least one of said pair of hydraulic cylinders or a discharge position for allowing the fluid to be discharged from at least one of said pair of hydraulic cylinders, said second valve assembly being actuated by said second solenoid to obtain a first position in which the flow of the fluid is restricted at the time when the fluid is discharged from at least one of said pair of hydraulic cylinders and a second position in which the fluid flows without any restriction; and
 a change speed control means for controlling the operation of said ratio selecting means, the change speed control means being connected to said first and second solenoids to energize and deenergize each of said first and second solenoids, the change speed control means selectively energizing and deenergizing said first and second solenoid such that it selects one of the first and second states to permit the pressurized fluid to be fed into or discharged from at least one of said pair of hydraulic cylinders in the first or second state, or to restrict the flow of the pressurized fluid when said ratio selecting means is placed in the third state.

19. The hydraulic control system of claim 18, wherein said second valve assembly is provided on a fluid passage which connects said first valve assembly to at least one of said pair of hydraulic cylinders, and said second valve assembly permits the fluid to flow without any restriction when an ON/OFF state of said second solenoid is different from an ON/OFF state of said first solenoid, and said second valve assembly restricts the flow of the fluid when the ON/OFF state of said second solenoid is the same as the ON/OFF state of said first solenoid.

20. The hydraulic control system of claim 18, wherein said second valve assembly includes an orifice for restricting the flow of the fluid when said ratio selecting means is placed in the third state.

21. The hydraulic control system of claim 18, wherein said first valve assembly includes another solenoid valve provided with said first solenoid, and a spool valve which communicates with an hydraulic source and with said second valve assembly and is operated with a pressure exerted by said another solenoid valve.

22. The hydraulic control system of claim 18, wherein said second valve assembly includes another solenoid valve provided with said second solenoid, and a spool valve which communicates with said first valve assembly and with at least one of said pair of hydraulic cylinders and is operated with a pressure exerted by said another solenoid valve.

* * * * *